J. B. Cotton,

Automatic Gate.

No. 106,917.   Patented Aug. 30, 1870.

WITNESSES.
A. A. Witner
A. L. Peek

INVENTOR.
J. B. Cotton
By his atty
H. P. K. Peek

United States Patent Office.

JAMES B. COTTOM, OF DAYTON, OHIO.

Letters Patent No. 106,917, dated August 30, 1870.

IMPROVEMENT IN AUTOMATIC GATES.

The Schedule referred to in these Letters Patent and making part of the same

*To all whom it may concern:*

Be it known that I, JAMES B. COTTOM, of Dayton, in the county of Montgomery and State of Ohio, have invented certain new and useful Improvements in Automatic Gates; and I do hereby declare that the following is a full and exact description thereof, reference being had to the accompanying drawing and to the letters of reference marked thereon.

Figure 1 of the drawing represents a perspective view of my improved gate;

My present invention relates to certain improvements upon the invention for which my application for Letters Patent was filed in the United States Patent Office, January 4, 1870; and consists in the combination of an adjustable hinge with the elongated lower crank of the pivot-shaft by which the gate is hung.

The gate A, posts B C D, rods E, angle-irons G, and the other parts of the structure, except the pivot-shaft N and hinge X, do not essentially differ from the same devices which were described in my application of January 4, 1870, above referred to. And the operation of the gate by a passing vehicle, the wheels of which will actuate the angle-irons G, to open and close the gate, is substantially the same as described in my said former application.

Figure 1:
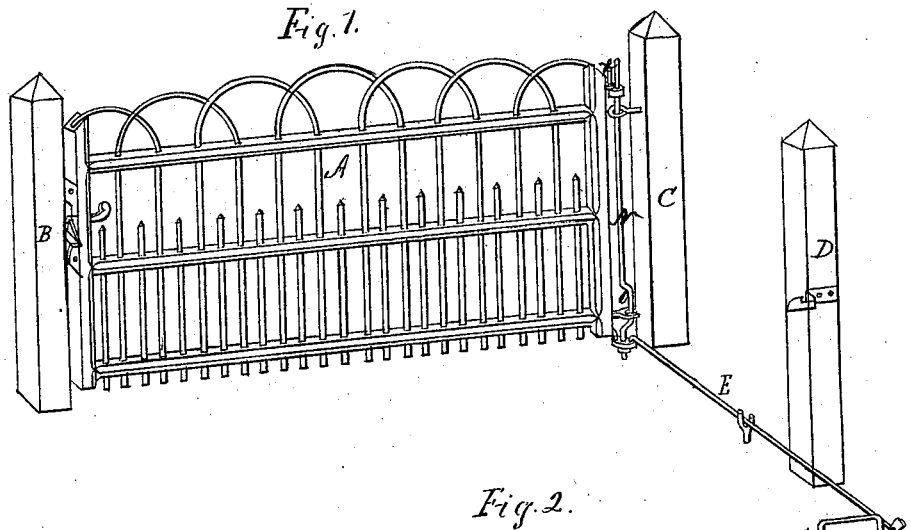
Figure 3:
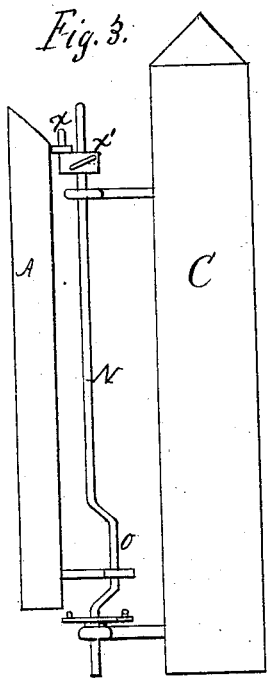
Figure 3 is a sectional elevation.
Figure 2:
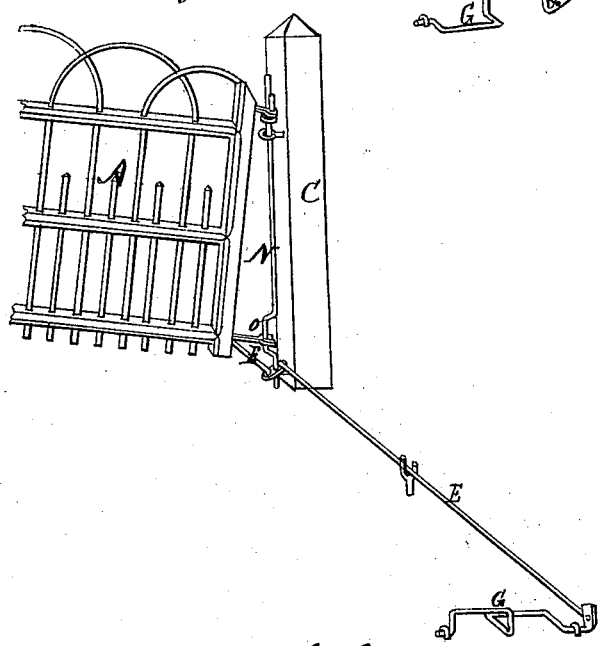
Figure 2 represents the gate adjusted.

The pivot of the upper hinge X is connected with a collar, X', seen in fig. 3, and the collar is adjustable upon shaft N.

The crank O is elongated upon shaft N, so as to admit of the adjustment of the collar X', by which the gate may be raised up and secured upon pivot-shaft N at any desired elevation, by the thumb-screw, which passes through the collar X', as seen in fig. 3 of the drawing.

The object of the adjustment is to adapt the gate to be freely opened and closed when the ground over which it swings is obstructed by snow, or from other causes.

Having fully described my improvements in automatic gates,

What I claim, and desire to secure by Letters Patent, is—

The combination of the adjustable hinge X X', with the pivot-shaft N, provided with the elongated crank O, substantially as and for the purpose described.

In testimony whereof I have hereunto set my hand this 19th day of April, 1870.

J. B. COTTOM.

Witnesses:
H. P. K. PECK,
F. V. SPRUNDEL.